(12) United States Patent
Polocoser et al.

(10) Patent No.: US 9,493,140 B2
(45) Date of Patent: Nov. 15, 2016

(54) COUPLER ASSEMBLY FOR WIPER ASSEMBLY

(71) Applicant: TRICO PRODUCTS CORPORATION, Rochester Hill, MI (US)

(72) Inventors: Mitica Polocoser, Wayne, MI (US); Kyle Moll, Oxford, MI (US)

(73) Assignee: Trico Products Corporation, Rochester Hills, MI (US)

( * ) Notice: Subject to any disclaimer, the term of this patent is extended or adjusted under 35 U.S.C. 154(b) by 200 days.

(21) Appl. No.: 14/093,987

(22) Filed: Dec. 2, 2013

(65) Prior Publication Data

US 2015/0151715 A1    Jun. 4, 2015

(51) Int. Cl.
*B60S 1/38*    (2006.01)

(52) U.S. Cl.
CPC ............ *B60S 1/3858* (2013.01); *B60S 1/3879* (2013.01)

(58) Field of Classification Search
CPC .................. B60S 1/3858; B60S 1/3879; B60S 1/3877; B60S 1/3889
USPC ....................................... 15/250.32, 250.201
See application file for complete search history.

(56) References Cited

U.S. PATENT DOCUMENTS

| | | |
|---|---|---|
| 2,589,339 A | 3/1952 | Carson |
| 2,616,112 A | 11/1952 | Smulski |
| 2,643,411 A | 6/1953 | Nesson |
| 2,799,887 A | 7/1957 | Nemic |
| 2,801,436 A | 8/1957 | Scinta |
| 2,814,820 A | 12/1957 | Elliott et al. |
| 2,932,843 A | 4/1960 | Zaiger et al. |
| 2,937,393 A | 5/1960 | Brueder |
| 2,946,078 A | 7/1960 | Deibel et al. |
| 2,974,341 A | 3/1961 | Hart |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,132,367 A | 5/1964 | Wise |
| 3,147,507 A | 9/1964 | Glynn |
| 3,179,969 A | 4/1965 | Glynn |
| 3,192,551 A | 7/1965 | Appel |
| 3,234,578 A | 2/1966 | Golub et al. |

(Continued)

FOREIGN PATENT DOCUMENTS

| | | |
|---|---|---|
| DE | 1028896 B | 4/1958 |
| DE | 1247161 B | 8/1967 |

(Continued)

OTHER PUBLICATIONS

DE10058208A1 (machine translation), 2009.*
Mar. 23, 2015 Written Opinion for PCT/US2014/067898.

*Primary Examiner* — Monica Carter
*Assistant Examiner* — Andrew A Horton
(74) *Attorney, Agent, or Firm* — Miller Canfield (57) ABSTRACT

A coupler assembly for a wiper assembly includes a coupler adapted to be attached to at least one support member of the wiper assembly and a retention clip cooperating with the coupler and adapted to engage the at least one support member to retain the at least one support member and the coupler together and prevent longitudinal movement therebetween.

9 Claims, 9 Drawing Sheets

(56) References Cited

U.S. PATENT DOCUMENTS

| | | |
|---|---|---|
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| 3,378,874 A | 4/1968 | Scinta |
| D211,570 S | 7/1968 | Tomlin |
| 3,418,679 A | 12/1968 | Barth et al. |
| 3,480,986 A | 12/1969 | Forster |
| 3,588,942 A | 6/1971 | Schlesinger |
| 3,618,155 A | 11/1971 | Mower |
| 3,641,614 A | 2/1972 | Newsome |
| 3,665,544 A | 5/1972 | Sakamoto |
| 3,673,631 A | 7/1972 | Yamadai et al. |
| 3,685,086 A | 8/1972 | Frohlich |
| 3,751,754 A | 8/1973 | Quinlan et al. |
| 3,780,395 A | 12/1973 | Quinlan et al. |
| 3,845,519 A | 11/1974 | Quinlan et al. |
| 3,862,465 A | 1/1975 | Ito |
| 3,872,537 A | 3/1975 | Biachi |
| 3,879,793 A | 4/1975 | Schlegel |
| 3,881,214 A | 5/1975 | Palu |
| 4,028,770 A | 6/1977 | Appel |
| 4,063,328 A | 12/1977 | Arman |
| 4,083,642 A | 4/1978 | Journee |
| 4,102,003 A | 7/1978 | Hancu |
| 4,127,916 A | 12/1978 | van den Berg et al. |
| 4,132,490 A | 1/1979 | Journee |
| 4,158,513 A | 6/1979 | Journee |
| 4,224,001 A | 9/1980 | Arndt et al. |
| 4,300,259 A | 11/1981 | Maiocco |
| 4,309,790 A | 1/1982 | Bauer et al. |
| 4,339,839 A | 7/1982 | Knights |
| 4,343,063 A | 8/1982 | Batt |
| D267,939 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| 4,570,284 A | 2/1986 | Verton |
| 4,587,686 A | 5/1986 | Thompson |
| 4,590,638 A | 5/1986 | Beneteau |
| 4,741,071 A | 5/1988 | Bauer et al. |
| 4,766,636 A | 8/1988 | Shinpo |
| 4,782,547 A | 11/1988 | Mohnach |
| 4,807,326 A | 2/1989 | Arai et al. |
| 4,852,206 A | 8/1989 | Fisher |
| D307,408 S | 4/1990 | Mower et al. |
| D308,660 S | 6/1990 | Fisher |
| D308,845 S | 6/1990 | Charet et al. |
| 4,976,001 A | 12/1990 | Wright |
| 4,980,944 A | 1/1991 | Longman |
| 4,984,325 A | 1/1991 | Arai et al. |
| 4,989,290 A | 2/1991 | Hoshino |
| 5,042,106 A | 8/1991 | Maubray |
| 5,056,183 A | 10/1991 | Haney, III |
| 5,062,176 A | 11/1991 | Unterborn et al. |
| 5,084,933 A | 2/1992 | Buechele |
| 5,086,534 A | 2/1992 | Journee |
| 5,093,954 A | 3/1992 | Kuzuno |
| 5,123,140 A | 6/1992 | Raymond |
| 5,138,739 A | 8/1992 | Maubray |
| 5,168,596 A | 12/1992 | Maubray |
| 5,168,597 A | 12/1992 | Schoen et al. |
| 5,170,527 A | 12/1992 | Lyon, II |
| 5,179,761 A | 1/1993 | Buechele et al. |
| 5,206,969 A | 5/1993 | Patterson et al. |
| 5,218,735 A | 6/1993 | Maubray |
| 5,228,167 A | 7/1993 | Yang |
| 5,233,721 A | 8/1993 | Yang |
| 5,257,436 A | 11/1993 | Yang |
| 5,276,937 A | 1/1994 | Lan |
| 5,283,925 A | 2/1994 | Maubray |
| 5,307,536 A | 5/1994 | Lescher |
| 5,311,636 A | 5/1994 | Lee |
| 5,319,826 A | 6/1994 | Mower |
| 5,325,564 A | 7/1994 | Swanepoel |
| 5,332,328 A | 7/1994 | Yang |
| 5,383,249 A | 1/1995 | Yang |
| 5,392,487 A | 2/1995 | Yang |
| 5,392,489 A | 2/1995 | Mohnach |
| 5,454,135 A | 10/1995 | Okuya et al. |
| 5,463,790 A | 11/1995 | Chiou et al. |
| 5,485,650 A | 1/1996 | Swanepoel |
| 5,509,166 A | 4/1996 | Wagner et al. |
| 5,553,962 A | 9/1996 | Eustache |
| 5,606,765 A | 3/1997 | Ding |
| 5,611,103 A | 3/1997 | Lee |
| 5,618,124 A | 4/1997 | Chen |
| 5,632,059 A | 5/1997 | Lee |
| 5,724,700 A | 3/1998 | Marks |
| 5,807,016 A | 9/1998 | Herring et al. |
| 5,885,023 A | 3/1999 | Witek et al. |
| 5,937,474 A | 8/1999 | Hussaini |
| 5,946,764 A | 9/1999 | Tworzydlo |
| 5,956,801 A | 9/1999 | Jeffer et al. |
| 6,000,093 A | 12/1999 | Charng |
| 6,158,078 A | 12/2000 | Kotlarski |
| 6,161,249 A | 12/2000 | Hussaini |
| 6,279,191 B1 | 8/2001 | Kotlarski et al. |
| 6,292,974 B1 | 9/2001 | Merkel et al. |
| 6,332,236 B1 | 12/2001 | Ku |
| 6,353,962 B1 | 3/2002 | Matsumoto et al. |
| 6,434,780 B1 | 8/2002 | Kotlarski |
| 6,523,218 B1 | 2/2003 | Kotlarski |
| 6,550,096 B1 | 4/2003 | Stewart et al. |
| 6,553,607 B1 | 4/2003 | De Block |
| 6,581,237 B1 | 6/2003 | Kotlarski |
| 6,591,445 B2 | 7/2003 | Nacamuli |
| 6,599,051 B1 | 7/2003 | Jarasson |
| 6,611,988 B1 | 9/2003 | De Block |
| 6,625,842 B1 | 9/2003 | De Block |
| 6,634,056 B1 | 10/2003 | De Block |
| 6,654,983 B1 | 12/2003 | Raynaud |
| 6,665,905 B2 | 12/2003 | Wegner et al. |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,687,948 B2 | 2/2004 | Kotlarski |
| 6,779,223 B1 | 8/2004 | Roekens |
| 6,789,289 B2 | 9/2004 | Roodt |
| 6,792,644 B2 | 9/2004 | Roodt |
| 6,836,924 B2 | 1/2005 | Egan-Walter |
| 6,836,926 B1 | 1/2005 | De Block |
| 6,944,905 B2 | 9/2005 | De Block et al. |
| 6,966,096 B2 | 11/2005 | Baseotto et al. |
| 7,028,368 B2 | 4/2006 | Lee et al. |
| 7,055,207 B2 | 6/2006 | Coughlin |
| 7,150,066 B2 | 12/2006 | Huang |
| 7,207,082 B2 | 4/2007 | Lee |
| 7,228,588 B2 | 6/2007 | Kraemer et al. |
| 7,281,294 B2 | 10/2007 | Wilms et al. |
| 7,287,296 B2 | 10/2007 | Vacher |
| 7,451,520 B2 | 11/2008 | Weiler et al. |
| 7,523,522 B2 | 4/2009 | Herring et al. |
| 7,546,660 B2 | 6/2009 | Heinrich et al. |
| 7,581,279 B2 | 9/2009 | Baseotto et al. |
| 7,621,016 B2 | 11/2009 | Verelst et al. |
| 7,774,892 B2 | 8/2010 | Coughlin |
| 8,042,218 B2 | 10/2011 | Moll et al. |
| 2002/0026681 A1 | 3/2002 | Nacamuli |
| 2003/0159229 A1 | 8/2003 | Weiler et al. |
| 2004/0019997 A1 | 2/2004 | Baseotto et al. |
| 2004/0025281 A1 | 2/2004 | Baseotto et al. |
| 2004/0123414 A1 | 7/2004 | Lee |
| 2006/0130263 A1 | 6/2006 | Coughlin |
| 2007/0174989 A1 | 8/2007 | Moll et al. |
| 2008/0066254 A1 | 3/2008 | Vacher |

(56) References Cited

U.S. PATENT DOCUMENTS

| | | | |
|---|---|---|---|
| 2008/0098554 A1* | 5/2008 | Cho | B60S 1/38 15/250.32 |
| 2009/0199357 A1 | 8/2009 | Thienard | |
| 2012/0317741 A1 | 12/2012 | Benner et al. | |

FOREIGN PATENT DOCUMENTS

| | | | |
|---|---|---|---|
| DE | 1505397 A1 | 10/1969 | |
| DE | 1655410 A1 | 8/1971 | |
| DE | 2311293 A1 | 9/1974 | |
| DE | 2336271 A1 | 2/1975 | |
| DE | 2350302 A1 | 4/1975 | |
| DE | 2353368 A1 | 5/1975 | |
| DE | 2640399 A1 | 3/1977 | |
| DE | 19729865 A1 | 1/1999 | |
| DE | 19734843 A1 | 2/1999 | |
| DE | 19814609 A1 | 10/1999 | |
| DE | 10335393 A1 | 9/2004 | |
| DE | 10058208 B4 * | 6/2009 | B60S 1/38 |
| EP | 0240357 A1 | 10/1987 | |
| EP | 0594451 A1 | 4/1994 | |
| FR | 1069875 A | 2/1954 | |
| FR | 2377302 A1 | 8/1978 | |
| FR | 2515121 A1 | 4/1983 | |
| GB | 878951 A | 10/1961 | |
| GB | 1012902 A | 12/1965 | |
| GB | 1489791 | 4/1975 | |
| GB | 1395918 A | 5/1975 | |
| GB | 2308542 A | 7/1997 | |
| JP | 2007-331748 A | 12/2007 | |
| WO | 200021809 A1 | 4/2000 | |
| WO | 2002087935 A1 | 11/2002 | |
| WO | 2003051696 A1 | 6/2003 | |
| WO | 2003080409 A1 | 10/2003 | |
| WO | 2004048163 A1 | 6/2004 | |
| WO | 2004076251 A1 | 9/2004 | |
| WO | 2004076252 A1 | 9/2004 | |
| WO | 2006069648 A1 | 7/2006 | |
| WO | 2009133979 A1 | 11/2009 | |
| WO | WO 2010016000 A1 * | 2/2010 | B60S 1/3858 |
| WO | 2011131395 A2 | 10/2011 | |
| WO | WO 2011161619 A1 * | 12/2011 | B60S 1/3858 |

* cited by examiner

COUPLER ASSEMBLY FOR WIPER ASSEMBLY

BACKGROUND OF THE INVENTION

1. Field of the Invention

The present invention relates generally to wiper assemblies for wiper systems and, more specifically, to a coupler assembly for a wiper assembly.

2. Description of the Related Art

Conventional wiper systems for vehicles known in the related art include some type of wiper assembly mounted to a wiper arm which, in turn, is mounted adjacent to a surface to be wiped such as a windshield of the vehicle and pivotally driven to impart reciprocal motion to the wiper assembly across the windshield. The wiper assembly typically includes a rubber wiping element that contacts the windshield across the surface to be wiped. The wiper assembly often incorporates one or more metal strips that act to reinforce the wiping element and facilitate wiping contact by the wiping element across what is typically a curved glass surface. In this context, the wiper arm delivers a downward force to the wiper assembly that is distributed thereacross pressing the wiper assembly into contact with the windshield. The wiper assembly may also include an airfoil and a pair of end caps located at the distal ends of the wiper assembly. The wiper assembly may also include a coupler that connects the wiper assembly to the wiper arm.

Current technology of wiper assemblies utilizes one of three methods for attaching components of a wiper assembly together. These components include a wiper element, support member, airfoil, and coupler. The first method includes bonding the wiper element to a single beam of the support member and attaching the airfoil. The second method includes sandwiching the wiping element between a set of splines of the support member which are held together by end caps. The third method includes carrying the wiper element by a channel in the airfoil with a support member that feeds through the airfoil and a channel in the coupler, the system being then held together with end caps to prevent the support member from sliding out of the airfoil.

In the methods above, it is desired to improve retention of the support member to the coupler. It is also desired to separate splines of the support member to allow a free movement of the wiping element. It is further desired to separate splines of the support member to provide the ability to replace the wiping element. Therefore, there is a need in the art for retaining the coupler and support member of a wiper assembly together.

SUMMARY OF THE INVENTION

The present invention overcomes the disadvantages in the related art in a coupler assembly for a wiper assembly. The coupler assembly includes a coupler adapted to be attached to at least one support member of the wiper assembly and a retention clip cooperating with the coupler and adapted to engage the at least one support member to retain the at least one support member and the coupler together and prevent longitudinal movement therebetween.

In addition, the present invention is a wiper assembly including a wiping element adapted to contact a surface to be wiped. The wiper assembly also includes at least one support member acting to support the wiping element. The wiper assembly further includes an airfoil operatively mounted to the support member and the wiping element. The wiper assembly still further includes a coupler assembly attached to the at least one support member and adapted to attach to a wiper arm, the coupler assembly retaining the at least one support member together and preventing longitudinal movement therebetween.

In this way, the coupler assembly of the present invention attaches the coupler and support member components of a wiper assembly together. The coupler assembly of the present invention improves retention of the support member to the coupler. The coupler assembly of the present invention separates splines of the support member to allow the free movement of the wiping element. In addition, the coupler assembly of the present invention separates splines of the support member to provide the ability to replace the wiping element. The coupler assembly of the present invention can be used for wiper systems in any type of transportation from automotive vehicles, heavy-duty trucks, trains, air planes, ships, large construction vehicles, or military vehicles or any other type of vehicles that contain surface wiper systems.

Other objects, features, and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
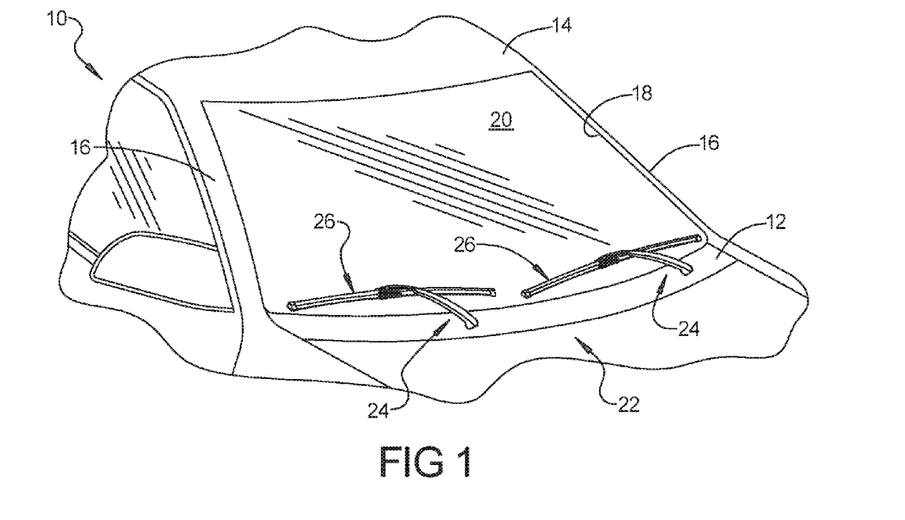
FIG. 1 is a partial perspective view of a front of a vehicle having a pair of wiper assemblies, according to one embodiment of the present invention, pivotally mounted for reciprocal movement across a windshield of the vehicle.

Referring now to the figures, where like numerals are used to designate like structure, a portion of a vehicle is schematically illustrated at 10 in FIG. 1. The vehicle 10 includes a cowl 12, a roof 14, and a pair of laterally spaced front or "A" pillars 16 extending between the roof 14 and the cowl 12. The A-pillars 16, roof 14, and cowl 12 cooperate to define a generally rectangular opening 18 in which is supported a curved or "swept back" glass windshield 20. As illustrated, the vehicle 10 is an automotive vehicle, but may be any type of vehicle such as heavy-duty trucks, trains, air planes, ships, large construction vehicles, or military vehicles or any other type of vehicle that contain surface wiper systems.

A wiper system is generally indicated at 22 in FIG. 1 and is employed to clean the windshield 20. The wiper system 22 includes a pair of wiper arms, generally indicated at 24, and a pair of wiper assemblies, according to the present invention and generally indicated at 26, which correspond to the driver and passenger side of the vehicle 10. However, those having ordinary skill in the art will appreciate that the wiper system 22 could employ a single wiper arm 24 and a single wiper assembly 26 without departing from the scope of the present invention.

In the representative example illustrated herein, each wiper assembly 26 is carried by a corresponding wiper arm 24. The wiper arm 24 may include an attachment member (not shown) adapted to operatively engage the wiper assembly 26. The wiper system 22 also includes an electrical motor (not shown, but generally known in the art) to move the wiper assemblies 26 in an oscillating manner across the surface of the windshield 20.

While the wiper assembly 26 illustrated in FIG. 1 is shown in connection with the front windshield 20 of the vehicle 10, those having ordinary skill in the art will appreciate that wiper assemblies 26 may be employed in other areas of the vehicle 10, such as a rear window (not shown) or a head lamp (not shown) that employ a wiper system. Thus, it will be understood that the present invention is not limited for use solely in connection with wiper arms 24 adapted for use on a vehicle's windshield 20, but for use in all applications where wiper arms 24 are employed.

Referring to FIGS. 2 through 8, the wiper assembly 26 includes a wiping element, generally indicated at 30, that is adapted to contact the surface of the vehicle 10 to be wiped, in this representative example, the windshield 20. The wiper assembly 26 also includes at least one support member, generally indicated at 34, that defines a longitudinal axis and that acts to reinforce or support the wiping element 30. In the representative embodiment illustrated herein, the support member 34 is a pair of splines 34A to operatively reinforce or support the wiping element 30. However, those having ordinary skill in the art will appreciate from the description that follows that the support member 34 may be either monolithic or defined by the pair of splines 34A. The wiper assembly 26 may also include an airfoil assembly, generally indicated at 36, to prevent the wiper assembly 26 from lifting from the surface of the windshield 20. The wiper assembly 26 may include one or more end caps, generally indicated at 38, to prevent the airfoil assembly 36 from disengaging the support member 34. Each of the above components will be described in greater detail below.

As illustrated in FIGS. 2 through 8, the wiping element 30 includes an upper section or portion 39 and a lower section or portion 40 that are partitioned by a longitudinally extending bridge or hinge section or portion 42. The hinge portion 42 provides flexibility between the upper portion 39 and lower portion 40 during operational movement of the wiper assembly 26 across the surface to be wiped. The upper portion 39 includes opposed grooves 43 extending laterally therein and longitudinally therealong between its longitudinal ends. The grooves 43 receive the splines 34A of the support member 34 and cooperate with the splines 34A of the support member 34 as will be described in detail below. The wiping element 30 also includes a predetermined length corresponding to particular application and is often manufactured through an extrusion process, which enables the length of the wiping element 30 to be easily adjusted without a substantial increase to manufacturing expense. Furthermore, while the wiping element 30 of the present invention is constructed from a flexible rubber, those having ordinary skill in the art will appreciate that it may be constructed from any flexible material such as silicone or other polymer without departing from the scope of the present invention.

The support member 34 may be constructed from a resiliently flexible material, such as spring steel or a polymer, and is adapted to apply force from an intermediate position between its longitudinal ends. More specifically, the support member 34 receives force from the spring-loaded wiper arm 24 at an intermediate position and distributes this force across the span of the support member 34 toward its longitudinal ends. To that end, the support member 34 may be curved longitudinally with a predetermined radius of curvature. This predetermined radius of curvature is sometimes referred to in the related art as a "free form" radius of curvature. Accordingly, the curvature of the support member 34 may be symmetrical or asymmetrical depending on the force requirements and the contour of the windshield 20. The flexible, free form, pre-curved support member 34 straightens out when the wiper arm 24 applies a force thereto to flatten the support member 34 and directs the wiping element 30 to contact the windshield 20. Thus, the elongated support member 34 includes a free-form curvature that ensures force distribution on windshields having various curvatures and that effects proper wrapping about the windshield 20.

As illustrated throughout the figures, the support member 34 has a substantially constant width and may have a constant thickness throughout the length between its longitudinal ends. The constant width and thickness are adapted to provide high lateral and torsional stiffness to avoid lateral and torsional deflection, which causes the wiping element 30 to stick/slip ("chatter") on the windshield 20 during operation. Thus, the cross-section of the support member 34 has a generally rectangular outer profile that makes the support member 34 easier to manufacture. More specifically, where the support member 34 is constructed from metal, such as spring steel, the tools and machinery used to manufacture the support member 34 are less complicated than that required to manufacture having varying widths and/or thicknesses. Furthermore, where the support member 34 is constructed from a polymer, such as a thermoplastic elastomer, the tools and extrusion process machinery are also less complicated than those employed to manufacture having varying widths and/or thicknesses. However, those having ordinary skill in the art will appreciate that the support member 34 illustrated herein may include a varying thickness and/or width without departing from the scope of the present invention.

Figure 3:
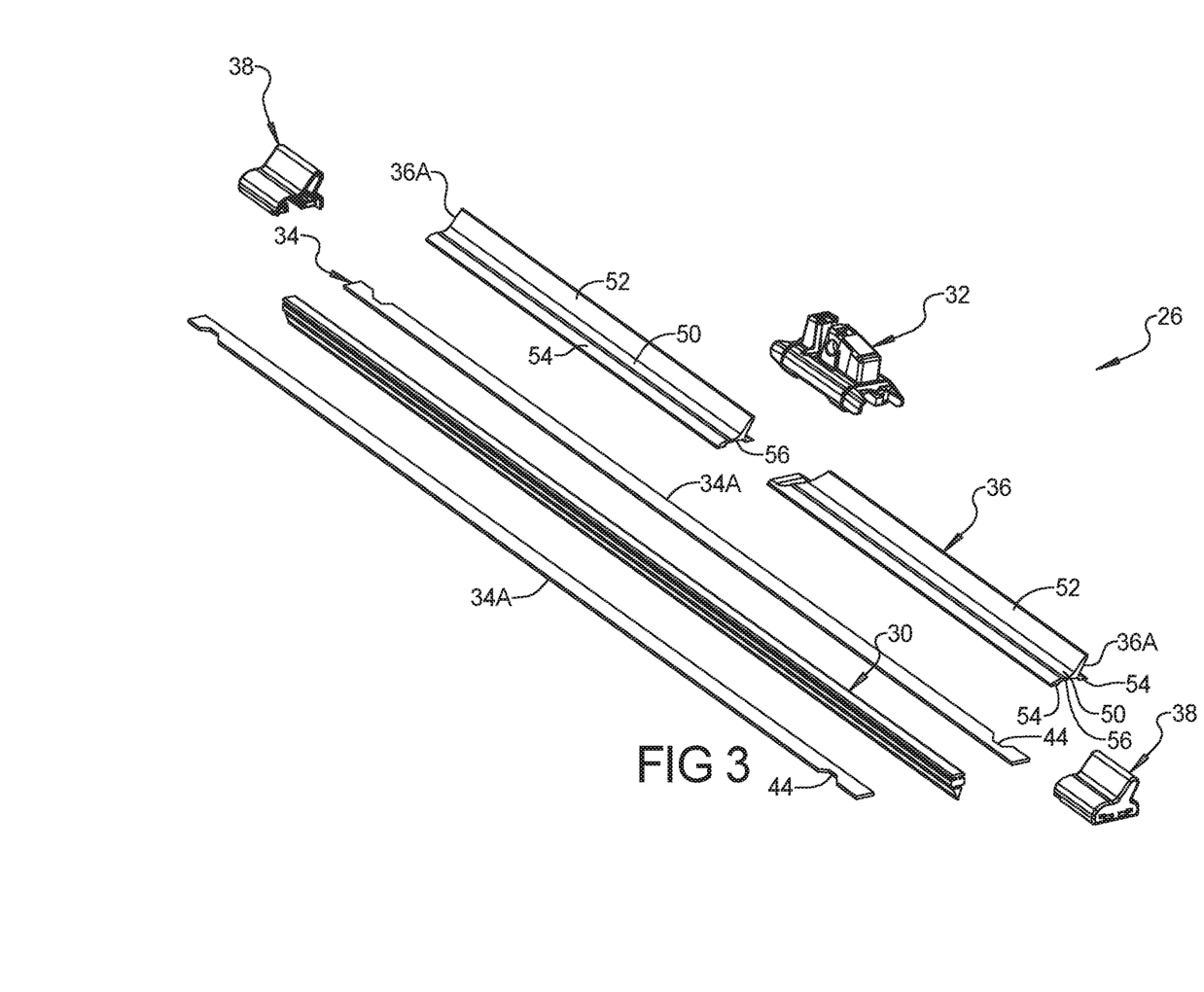
FIG. 3 is an exploded perspective view of one of the wiper assemblies, according to one embodiment of the present invention, of FIG. 2.
Figure 4:
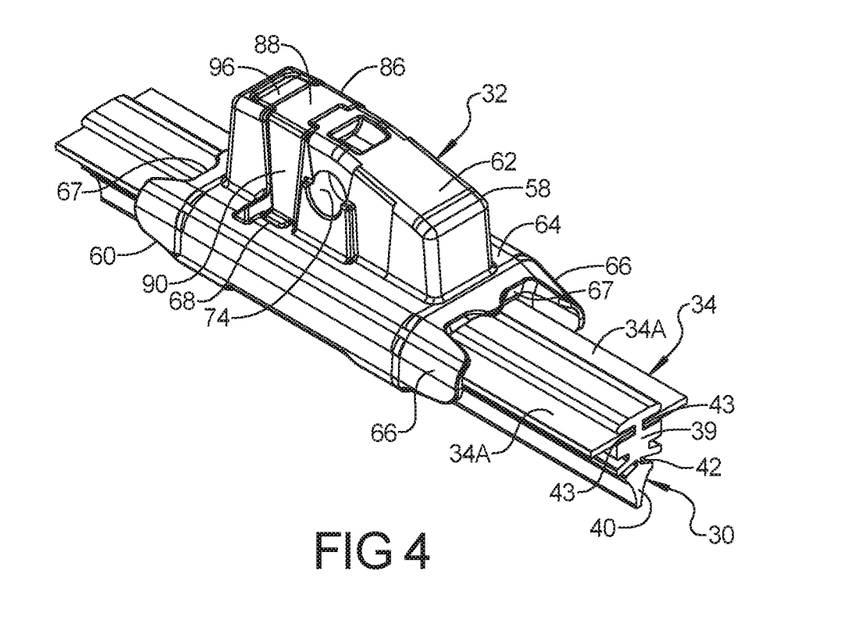
FIG. 4 is an enlarged perspective view of a coupler assembly, according to one embodiment of the present invention, and a portion of the wiper assembly of FIGS. 2 and 3.
Figure 5:
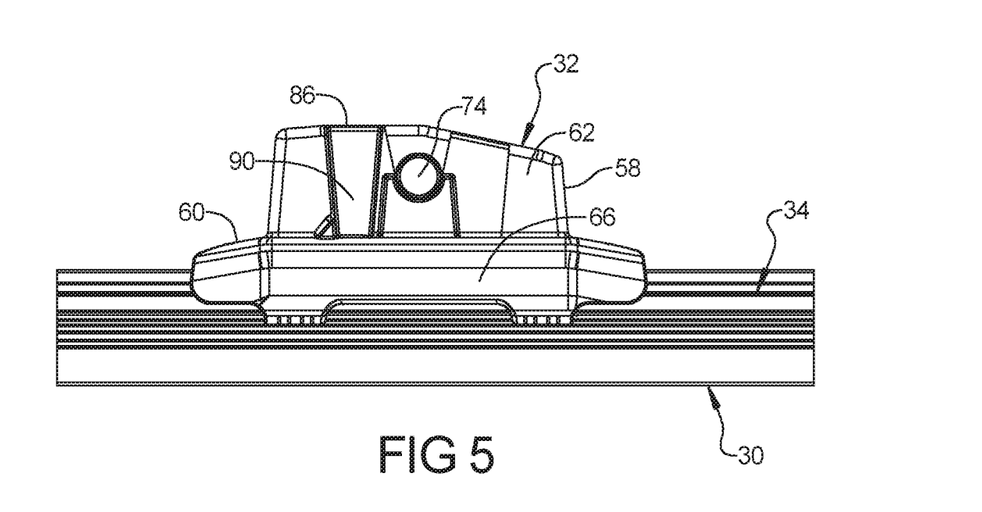
FIG. 5 is an enlarged side view of the coupler assembly, according to one embodiment of the present invention, and the portion of the wiper assembly of FIGS. 2 and 3.
Figure 6:
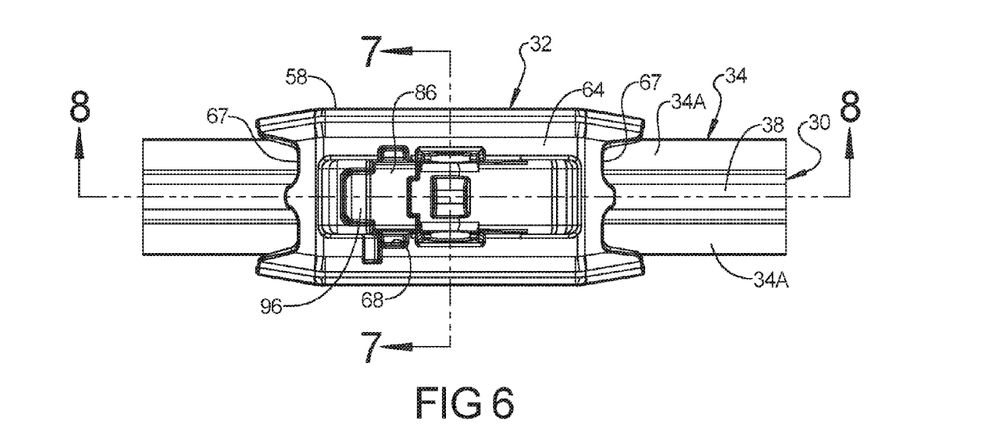
FIG. 6 is an enlarged top view of the coupler assembly, according to one embodiment of the present invention, and the portion of the wiper assembly of FIGS. 2 and 3.
Figure 7:
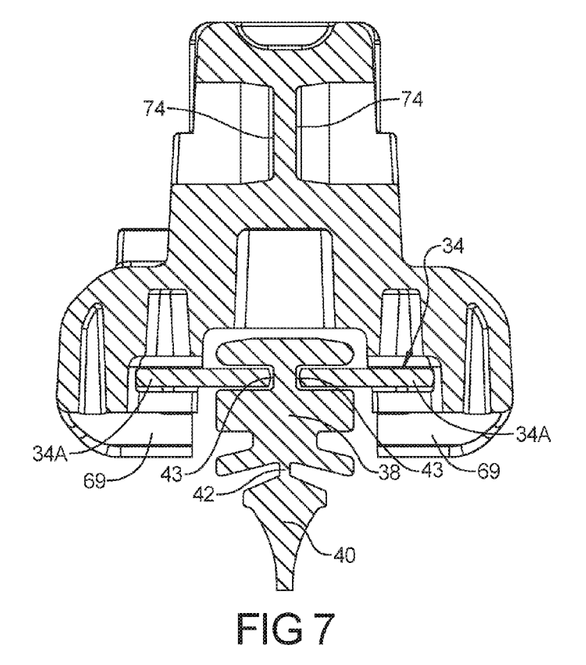
FIG. 7 is a sectional view taken along line 7-7 of FIG. 6.
Figure 8:
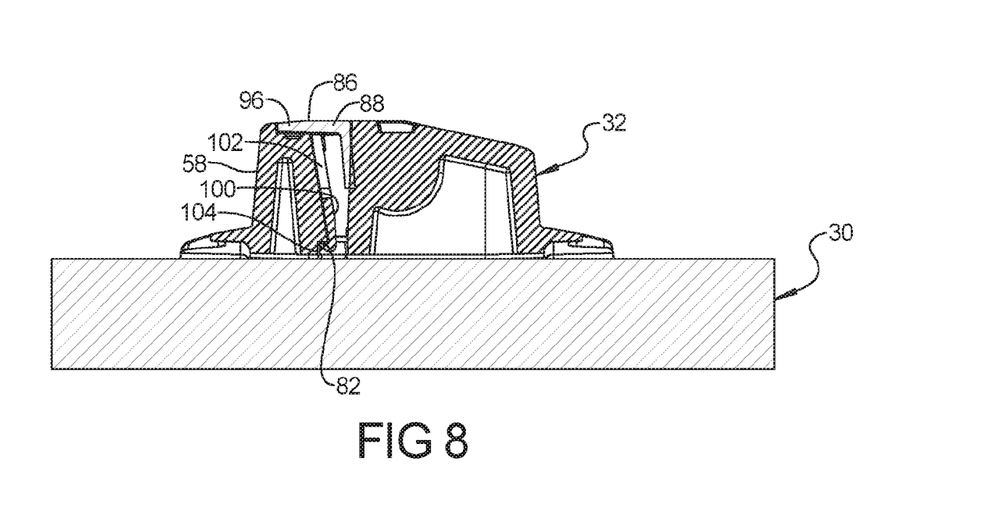
FIG. 8 is a sectional view taken along line 8-8 of FIG. 6.

Additionally, as illustrated in FIG. 3, the splines 34A of the support member 34 are disposed in the grooves 43 of the wiping element 30. The support member 34 may include one or more notches 44 extending therein. In the embodiment illustrated, the notches 44 are located near the longitudinal ends of the splines 34A of the support member 34. One notch 44 extends into each side of the splines 34A of the support member 34 such that the notches 44 oppose each other. The notches 44 are generally trapazoidal in shape, but may be any suitable shape. The notches 44 cooperate with the end caps 38 to retain the end caps 38 to the support member 34.

Figure 15:
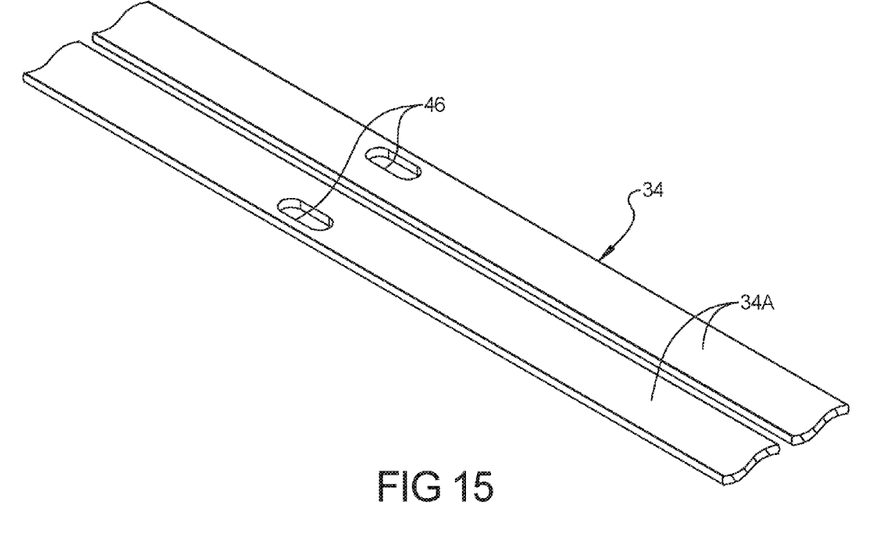
FIG. 15 is a partial perspective view of a support member of the wiper assembly of FIGS. 2 and 3.

Additionally, the support member 34 may include one or more apertures 46 extending therein. In the embodiment illustrated in FIG. 15, the apertures 46 are located near the center of the support member 34. One aperture 46 extends through each spline 34A of the support member 34 such that the apertures 46 oppose each other. The apertures 46 are generally rectangular in shape, but may be any suitable shape. The apertures 46 cooperate with the coupler assembly 32 as will be described in detail below.

As noted above, the wiper assembly 26 also includes a coupler assembly, according to one embodiment of the present invention and generally indicated at 32. The coupler assembly 32 is adapted to connect the wiper assembly 26 to the wiper arm 24. More specifically, those having ordinary skill in the art will appreciate that different OEM's employ wiper arm assemblies having different attachment members (not shown) adapted to operatively engage a specific wiper assembly. Accordingly, the coupler assembly 32 illustrated herein includes structure that operatively engages at least one or more of these different attachment members (not shown). Further by way of example, certain wiper arms employed by OEM's include "bayonet-style"; "pin-type"; or "hook-type" attachment members of various sizes that operatively engage the wiper assemblies.

As previously noted, the wiper assembly 26 includes the airfoil assembly, generally indicated at 36, to prevent the wiping assembly 26 from lifting from the surface of the windshield 20. The airfoil assembly 36 is operatively mounted to the wiping element 30 and the support member 34. The airfoil assembly 36 extends along the length of the wiping element 30 and the support member 34. The airfoil assembly 36 acts to reduce the likelihood of wind lift by allowing air to flow over the wiper assembly 26. More specifically, and in the embodiment illustrated herein, the airfoil assembly 36 includes a pair of airfoil components 36A that are operatively mounted to the wiping element 30 and the support member 34 with the coupler assembly 32 extending therebetween. However, those having ordinary skill in the art will appreciate that the airfoil assembly 36 may be defined by a single unitary component without departing from the scope of the present invention.

Referring to FIG. 3, each airfoil component 36A includes a body 50 extending longitudinally and a spoiler 52 that tapers outwardly from the body 50 toward a terminal point to define a profile that is slightly contoured. The body 50 also includes channel members 54 extending downwardly from the body 50 opposite the spoiler 52. The channel members 54 are generally "C" shaped to form a channel 56 to receive the support member 34. In addition, the airfoil component 36A may be manufactured through an extrusion process. However, those having ordinary skill in the art will appreciate that the airfoil component 36A may be manufactured using any other conventional mechanism.

Figure 2:
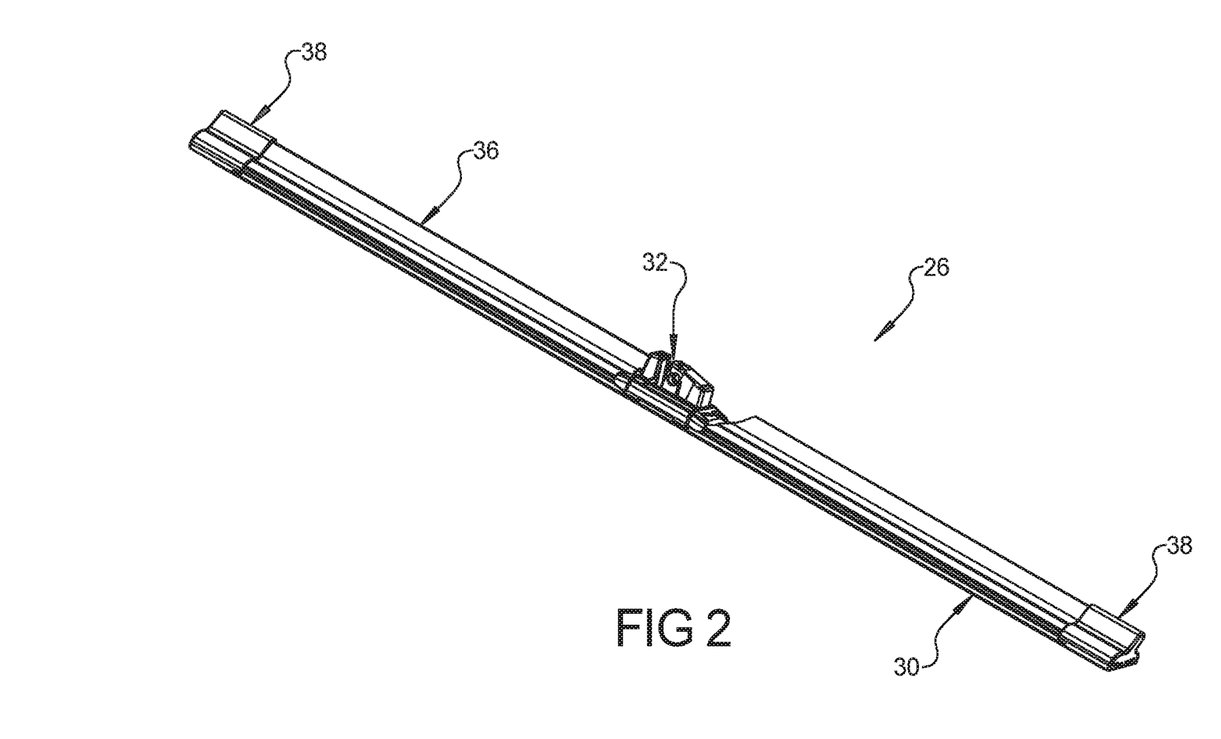
FIG. 2 is an enlarged perspective view of one of the wiper assemblies, according to one embodiment of the present invention, of FIG. 1.

As illustrated in FIGS. 2 and 3, the wiper assembly 26 may include the pair of end caps, generally indicated at 38. The end caps 38 are adapted to be disposed adjacent to the distal ends of the airfoil components 36A. The end caps 38 are secured to the support member 34. The end caps 38 include a profile that substantially mimics the contours of the airfoil assembly 36 to maintain the wind lift characteristics of the wiper assembly 26 and to provide an increased aesthetic value. The end caps 38 also provide a mass increase adjacent the distal ends of the airfoil components 36A that prevent localized chatter along the extremities of the wiping element 30 caused by the combination of wind lift and a decrease in the force distributed to this area from wiper arm 24 via the splines 34A, as above-described. It should be appreciated that the end caps 38 may have a locking arm (not shown) to engage the notches 44 in the splines 34A of the support member 34.

Referring to FIGS. 4 through 11, the coupler assembly 32, according to one embodiment of the present invention, includes a coupler 58 that cooperates with the support member 34. The coupler 58 includes a base portion 60 for attaching to the support member 34 and an attachment portion 62 that extends outwardly away from the base portion 60 for attaching to the attachment member (not shown) of the wiper arm 24. The base portion 60 includes a top wall 64 and a pair of side walls 66 extending from the top wall 64. The top wall 64 is generally rectangular in shape. The top wall 64 may have one or more recess 67 extending longitudinally therein to cooperate with an end portion of the airfoil component 36A. The top wall 64 also has an aperture 68 extending therethrough. The aperture 68 is generally rectangular in shape. The side walls 66 are generally rectangular in shape and extend generally perpendicular from each longitudinal side of the top wall 64. The base portion 60 includes a flange wall 69 extending laterally inwardly from each of the side walls 66 to form a space or channel 70 therebetween extending longitudinally to receive the wiping element 30. The flange walls 69 each have a groove 72 extending laterally therein to receive one of the splines 34A of the support member 34. It should be appreciated that the base portion 60 is mounted to the support member 34. It should be appreciated that the aperture 68 communicates with the grooves 72.

Figure 9:
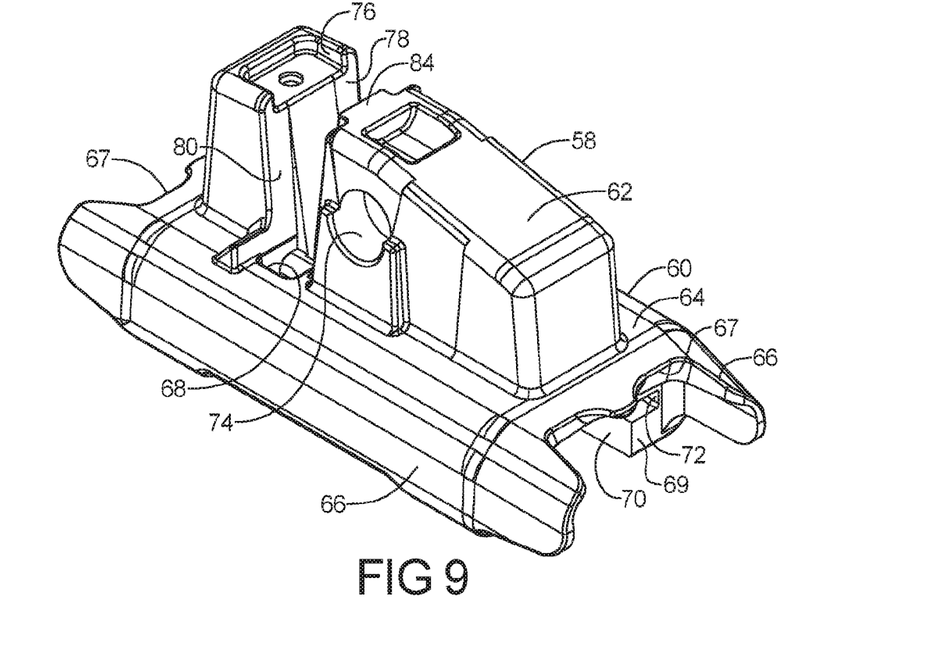
FIG. 9 is a perspective view of a coupler of the coupler assembly, according to one embodiment of the present invention, of FIGS. 4 through 6.
Figure 10:
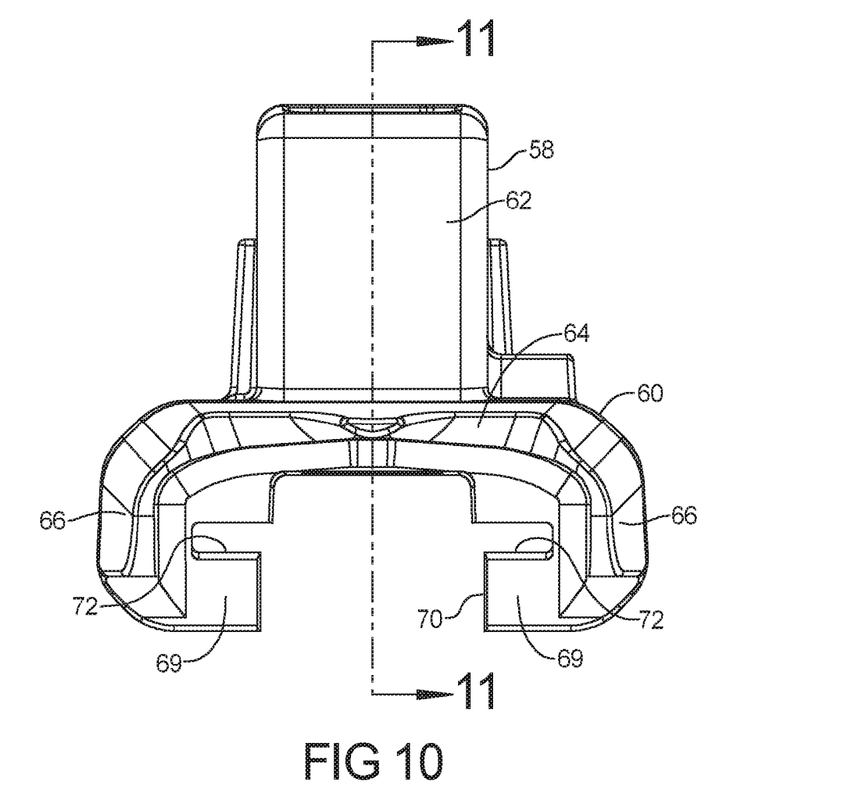
FIG. 10 is a side view of the coupler of the coupler assembly, according to one embodiment of the present invention, of FIGS. 4 through 6.
Figure 11:
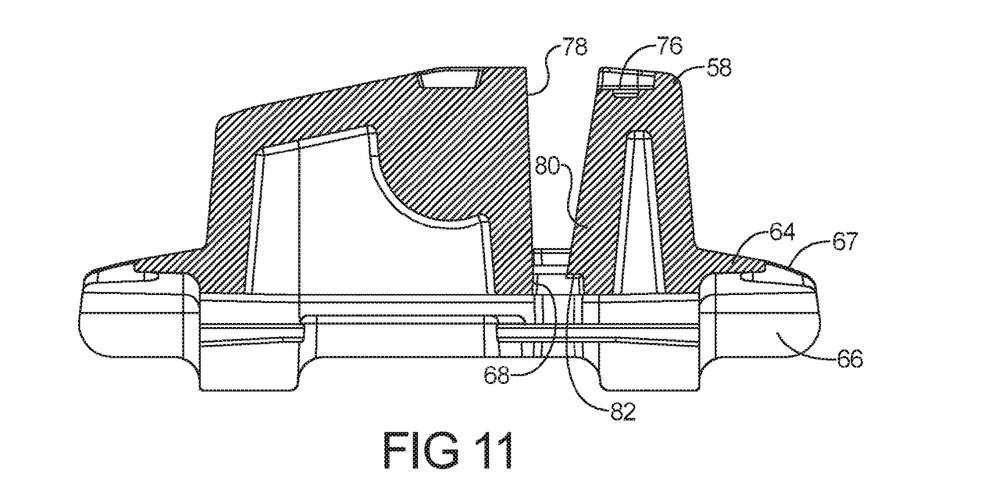
FIG. 11 is a sectional view taken along line 11-11 of FIG. 10.
Figure 12:
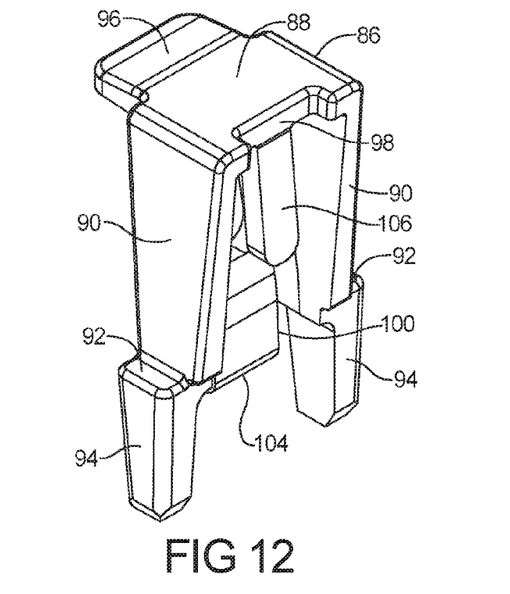
FIG. 12 is a perspective view of a retention clip of the coupler assembly, according to one embodiment of the present invention, of FIGS. 4 through 6.
Figure 13:
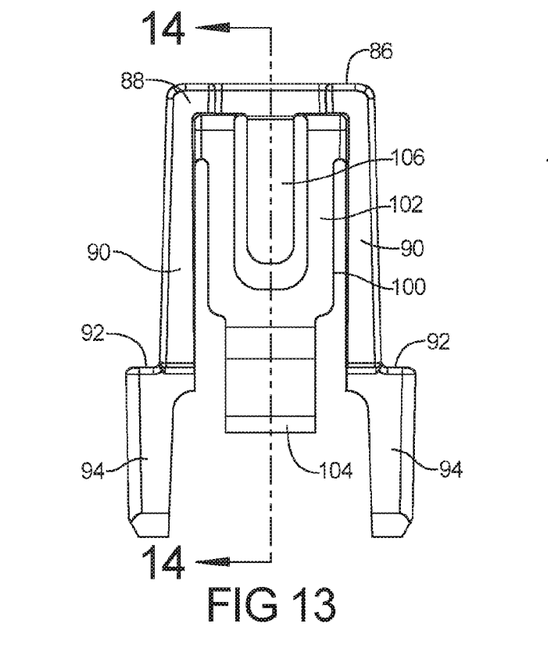
FIG. 13 is a side view of the retention clip of the coupler assembly, according to one embodiment of the present invention, of FIGS. 4 through 6.
Figure 14:
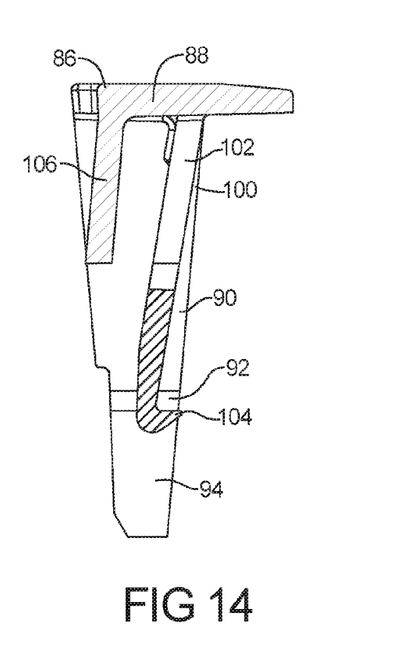
FIG. 14 is a sectional view taken along line 14-14 of FIG. 13.

The attachment portion 62 extends generally perpendicular from the top wall 64 of the coupler 58. In one embodiment, the attachment portion 62 is generally rectangular in shape, but may be any suitable shape. The attachment portion 62 may include opposed recessed portions 74 extending laterally therein to receive the attachment member (not shown) of the wiper arm 24. The attachment portion 62 also includes a recess 76 extending inwardly from a top thereof. The recess 76 is generally rectangular in shape, but may be any suitable shape. The attachment portion 62 includes an aperture 78 spaced longitudinally from the recess 76 and extending inwardly from the top thereof. The aperture 78 is generally "V" shaped and communicates with the aperture 68 in the top wall 64 of the base portion 60. The attachment portion 62 also includes a guide 80 extending inwardly along the aperture 78 from the top thereof with a recess 82 at the bottom thereof. The attachment portion 62 further includes a projection 84 extending longitudinally from the top thereof. The coupler 58 is made of a rigid material such as plastic. The coupler 58 is integral, unitary, and one-piece.

Referring to FIGS. 4 through 8 and 12 through 14, the coupler assembly 32, according to one embodiment of the present invention, also includes a retention clip 86 cooperating with the coupler 58 to separate the splines 34A of the support member 34 and to retain the splines 34A of the support member 34 and the coupler 58 together and prevents longitudinal movement therebetween. The retention clip 86 includes a top wall 88 and side walls 90 extending from the top wall 88 to form a general inverted "U" shape. The retention clip 86 has a shoulder wall 92 extending outwardly from each side wall 90 and an extension wall 94 extending from the shoulder wall 90 to extend into one of the apertures 46 in the splines 34A. The retention clip 86 also includes a tab 96 extending longitudinally from the top wall 88 to be disposed in the recess 76 of the attachment portion 60 of the coupler 58 and a recess 98 extending longitudinally into the top wall 88 opposite the tab 96 to receive the projection 84 of the attachment portion 60 of the coupler 58. The retention clip 86 also includes a locking arm 100 extending from the top wall 88 and disposed between the side walls 90 such that the locking arm 100 has an arm portion 102 that is cantilevered to the top wall 88 and can be deflected longitudinally. The locking arm 100 also has a tab portion 104 extending longitudinally from a free end of the arm portion 102. The tab portion 104 is generally rectangular in shape and hook shaped in cross-section, but may be any suitable shape. The tab portion 104 is displaceable into and out of the recess 82 below the attachment portion 62. The retention clip 86 may include a support portion 106 extending downwardly from the top wall 88 and spaced longitudinally from the locking arm 100. It should be appreciated that the extension walls 94 of the retention clip 86 extend into the apertures 46 in the splines 34A of the support member 34 and the locking arm 100 of the retention clip 86 locks to the coupler 58 to retain the coupler 58 and support member 34 together and prevent longitudinal movement relative to each other.

In operation, the wiper assembly 26 is assembled by sliding the splines 34A of the support member 34 in the grooves 43 of the wiping element 30. Next, the coupler 58 is slid over the support member 34 such that the splines 34A are disposed in the grooves 72 and the wiping element 30 is disposed in the channel 70 of the base portion 60 until the coupler 58 is centered along the support member 34. After that, the retention clip 86 is slid into the coupler 58. The retention clip 86 is slid into the aperture 78 of the attachment portion 62 of the coupler 58 and the tab portion 104 engages the guide 80 to deflect the tab portion 104 of the locking arm 100 longitudinally inward. The retention clip 86 continues to slide in the aperture 78 of the attachment portion 62 of the coupler 58 until the tab portion 104 is aligned with the recess 82. Once aligned, the locking arm 100 deflects longitudinally outwardly and the tab portion 104 of the locking arm 100 is disposed in the recess 82 to lock the retention clip 86 and the coupler 58 together. When this occurs, the tab 96 of the retention clip 86 is disposed in the recess 76 of the attachment portion 62, the projection 84 of the attachment portion 62 is disposed in the recess 98 of the retention clip 86, and the extension walls 94 of the retention clip 86 are disposed in the apertures 46 of the splines 34A.

Next, the airfoil components 36A are slid over the support member 34 and one of the longitudinal ends is disposed in the recess 67 of the coupler 58. Next, the end caps 38 are slid over the support member 34 such that the notches 44 in the splines 34A are engaged to retain the end caps 38 to the support member 34. It should be appreciated that the extension walls 94 of the retention clip 86 are disposed in the apertures 46 of the splines 34A to separates the splines 34A of the support member 34 to allow the free movement of the wiping element 30 and to prevent longitudinal movement of the splines 34A relative to the coupler 58. It should also be appreciated that the retention clip 86 is locked to the coupler 58 via the locking arm 100. It should be appreciated that the arm portion 102 of the locking arm 100 is parallel with the guide of the attachment portion 62 of the coupler 58 to prevent the retention clip 86 from rattling and having both surfaces parallel together gives the retention clip 86 a positive lock, when adding a force. It should still further be appreciated that a tool (not shown) may be used to deflect the locking arm 100 to allow an operator to remove the retention clip 86 from the coupler 58.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A coupler assembly for a wiper assembly comprising:
a coupler adapted to be attached to at least one support member of the wiper assembly, said coupler including a base portion adapted to be disposed over a portion of the at least one support member and an attachment portion extending outwardly from said base portion and adapted to connect to the wiper arm; said base portion including an aperture in communication with apertures in the at least one support member; said attachment portion including lateral side walls and an aperture extending through said lateral side walls and vertically into said aperture of said base portion; and
a retention clip cooperating with said coupler and adapted to engage the apertures in the at least one support member to retain the at least one support member and said coupler together and to prevent longitudinal movement therebetween when said retention clip is disposed in said aperture of said attachment portion of said coupler and also in said aperture of said base portion of said coupler; wherein said retention clip has a top wall and a plurality of side walls integrally formed with said top wall, extending from opposing lateral sides of said top wall, and adapted to be disposed in the apertures in the at least one support member; and wherein said retention clip includes a locking arm extending from said top wall and spaced between said side walls to retain said retention clip to said coupler.

2. A coupler assembly as set forth in claim 1 wherein said base portion includes a body forming a channel to receive a wiping element of the wiper assembly and a pair of grooves communicating with said channel to receive the at least one support member of the wiper assembly.

3. A coupler assembly as set forth in claim 2 wherein said aperture of said base portion extends through said body in communication with said grooves.

4. A coupler assembly as set forth in claim 1 wherein said locking arm comprises an arm portion cantilevered thereto and a tab portion extending longitudinally from said arm portion and being displaceable longitudinally.

5. A coupler assembly as set forth in claim 1 wherein said retention clip is disposed in said aperture of said attachment portion and has extensions disposed in said aperture of said base portion.

6. A coupler assembly as set forth in claim 1 wherein said attachment portion includes a guide extending along said aperture of said attachment portion to deflect said locking arm when said retention clip is disposed in said aperture.

7. A wiper assembly comprising:
a wiping element adapted to contact a surface to be wiped;
a pair of splines mounted to and acting to support said wiping element, each of said splines having an aperture extending therethrough;
an airfoil operatively mounted to said splines; and a coupler assembly including a coupler having a base portion mounted to said splines, and an attachment portion extending outwardly from said base portion and adapted to attach to a wiper arm, said base portion including an aperture in communication with said apertures in said splines, and said attachment portion having lateral side walls with an aperture extending through said lateral side walls and vertically into said aperture of said base portion, and wherein said base portion of said coupler includes a body forming a channel to receive said wiping element and a pair of grooves communicating with said channel to receive said splines; said coupler assembly further including a retention clip cooperating with said coupler and engaging said apertures in said splines so as to retain said splines and said coupler assembly together and prevent longitudinal movement therebetween when said retention clip is disposed in said aperture of said attachment portion of said coupler and also in said aperture of said base portion of said coupler; wherein said retention clip has a top wall and a plurality of side walls integrally formed with said top wall, extending from opposing lateral sides of said top wall and extending into said apertures in said splines; and wherein said retention clip includes a locking arm extending from said top wall and spaced between said side walls to retain said retention clip to said coupler.

8. A wiper assembly as set forth in claim 1 wherein said locking arm comprises an arm portion cantilevered thereto and a tab portion extending longitudinally from said arm portion and being displaceable longitudinally.

9. A wiper assembly as set forth in claim 8 wherein said attachment portion includes a guide extending along said aperture of said attachment portion to deflect said locking arm when said retention clip is disposed in said aperture.

* * * * *